UNITED STATES PATENT OFFICE 2,587,044

TREATMENT OF CEMENT RAW SLURRY

Thorbjorn Heilmann, Copenhagen, Denmark, assignor to F. L. Smidth & Co., New York, N. Y., a corporation of New Jersey No Drawing. Application February 8, 1950, Serial No. 143,161. In Great Britain February 14, 1949

2 Claims. (Cl. 106—100)

In the burning of cement the raw materials are often prepared by the wet process, in which they are made into a slurry. They can easily be homogeneously mixed in a slurry and the feeding of the slurry to a rotary kiln can be controlled very easily. In the kiln, however, the water in the slurry must be heated and evaporated, so the more water the slurry contains the greater is the amount of fuel which must be used. Now in the average cement raw slurry the water amounts to 60 per cent by weight of the dry materials and accordingly the amount of fuel consumed merely in driving off the water is large. This water content cannot be reduced to such a figure that the slurry becomes viscous, because then the slurry cannot be passed through pumps and will not flow evenly into the kiln.

In burning hydraulic or ordinary lime and in reducing ores slurries are sometimes also prepared and then the same considerations arise as with cement raw slurries.

It is known that the water content of slurry can be reduced to some extent without increasing the viscosity of the slurry if a colloidal dispersing agent is added to the slurry. To be useful, such a dispersing agent must be neither bulky nor expensive, since if it is its disadvantages outweigh its advantages. It is also known that the viscosity can be reduced, and so the water content reduced while the viscosity is kept constant, if the slurry is rendered alkaline.

The essential feature of the present invention is the addition of one or more alkali metal phosphates to the slurry, either during its preparation or after it has been formed. I have found that certain hexametaphosphates are good dispersing agents and their use, as described below, makes it possible easily to reduce the water content required if the slurry is to be sufficiently fluid for pumping.

The exact mechanism by which any dispersing agent increases the fluidity of a slurry is not clearly understood. It appears likely that at least in some slurries different constituents respond differently to different dispersing agents. However this may be, it is found desirable in the present invention also to add to the slurry one or more carbonates or hydroxides of the alkali or alkaline earth metals.

The preferred phosphates for the purpose are the hexametaphosphates of the alkalis and, more particularly, sodium hexametaphosphate. I have found it especially advantageous to employ in combination with such a hexametaphosphate a small amount of sodium carbonate, and either sodium hydroxide or calcium hydroxide may be included at the same time.

The total amount of the dispersing agent or mixture of dispersing agents required is small; in general it does not exceed 0.2 per cent by weight of the dry materials.

In addition to the hexmetaphosphate and any carbonate or hydroxide, it is also advantageous to include sulphite lye or sodium silicate, both of which are already known as dispersing agents. When such a dispersing agent is used, the amount of the hexametaphosphate required to render the slurry fluid at any given water content is reduced.

Some examples will now be given:

Example I

A cement raw slurry of a viscosity normal for pumping was produced by adding water to cement raw materials. The water content was 61.8 per cent by weight of the dry materials. Another slurry was prepared from the same raw materials and sodium hexametaphosphate in an amount equal to 0.039 per cent of the dry materials was added. It was found that the water content of the slurry need only be 54.9 per cent by weight of the dry materials to make this slurry of the same viscosity as the first.

Example II

A cement raw slurry of a viscosity suitable for pumping was made by adding water to other raw materials. The water content of this slurry was 61.0 per cent by weight of the dry materials. A second slurry was then prepared from the same raw materials with the addition of 0.0465 per cent sodium carbonate and 0.025 per cent hydrated lime containing 56 per cent available CaO. It was found that the water content of the slurry needed to be only 48.7 per cent of the dry materials to make the slurry of the same viscosity as the first. It was found impossible to reduce the water content of the slurry further by the addition of more sodium carbonate and calcium hydroxide without rendering the slurry too viscous for pumping. However, a third slurry was made from the same raw materials and an addition of the same amounts of sodium carbonate and calcium hydroxide as were used when the second slurry was made, together with 0.01 per cent of sodium hexametaphosphate. It was found that it was only necessary for the water content to be 43.0 per cent of the dry materials to make it of the same viscosity as the first and second slurries.

Example III

A cement raw slurry prepared from crystalline limestone was found to require a water content of 61.4 per cent of the dry materials when prepared in the normal way. A similar slurry of the same viscosity was found to require a water content of about 49 per cent by weight of the dry materials when 0.075 per cent sodium hexametaphosphate (by weight of the total slurry) was added. The use of a mixture of dispersing agents was more effective, as the same viscosity was produced with a water content of only 41.8 per cent of the dry materials when a mixture consisting of 0.05 per cent sodium carbonate, 0.05 per cent sulphite lye and 0.02 per cent sodium hexametaphosphate was added, the percentage being based on the total weight of the slurry.

Example IV

Another slurry made in the usual way from chalk and clay was found to need a water content of 38.5 per cent fluid to be easily pumped. This content was reduced to 28.5 per cent by the addition of a mixture of 0.05 per cent sodium carbonate, 0.05 per cent water glass and 0.01 per cent sodium hexametaphosphate.

I claim:
1. A method of preparing raw cement slurry sufficiently fluid to pump and containing a quantity of water otherwise insufficient for the purpose, which comprises incorporating in the slurry an amount of an alkali hexametaphosphate effective to appreciably increase the fluidity of the slurry, but not exceeding about 0.2 per cent of the weight of the dry materials present in the slurry.

2. A method of preparing raw cement slurry sufficiently fluid to pump and containing a quantity of water otherwise insufficient for the purpose, which comprises incorporating in the slurry an amount of sodium hexametaphosphate effective to appreciably increase the fluidity of the slurry, but not exceeding about 0.2 per cent of the weight of the dry materials present in the slurry.

THORBJORN HEILMANN.

REFERENCES CITED

The following references are of record in the file of this patent:

UNITED STATES PATENTS

| Number | Name | Date |
| --- | --- | --- |
| 1,242,236 | Pontoppidan | Oct. 9, 1917 |
| 1,438,588 | Feldenheimer | Dec. 12, 1922 |
| 2,111,517 | Vogel-Jorgensen | Mar. 15, 1938 |
| 2,162,525 | Breerwood | June 13, 1939 |
| 2,337,597 | Hall | Dec. 28, 1943 |
| 2,390,225 | Sherman | Dec. 4, 1945 |